United States Patent [19]

Lundell

[11] Patent Number: 4,872,515
[45] Date of Patent: Oct. 10, 1989

[54] DRILL ROD FOR PERCUSSION DRILLING
[75] Inventor: Lars-Gunnar Lundell, Sandviken, Sweden
[73] Assignee: Sandvik AB, Sandviken, Sweden
[21] Appl. No.: 108,089
[22] Filed: Oct. 14, 1987
[30] Foreign Application Priority Data
Oct. 15, 1986 [SE] Sweden ............................ 8604373
[51] Int. Cl.⁴ .............................................. B23B 45/16
[52] U.S. Cl. ........................................ 173/132; 285/55
[58] Field of Search ................... 173/132, 131; 285/55, 285/422

[56] References Cited
U.S. PATENT DOCUMENTS 2,955,847 10/1960 McKenna .
3,709,306 1/1973 Curington .
4,006,787 2/1977 Rumpp et al. ...................... 173/132
4,051,905 10/1977 Kleme ............................. 173/132 X
4,295,751 10/1981 Holmberg .
4,468,309 8/1984 White .
4,474,651 10/1984 Yauchi et al. .
4,630,849 12/1986 Fukui et al. .

FOREIGN PATENT DOCUMENTS
27907 1/1956 Finland .

Primary Examiner—Frank T. Yost
Assistant Examiner—Willmon Fridie, Jr.
Attorney, Agent, or Firm—Burns, Doane, Swecker & Mathis

[57] ABSTRACT

The present invention relates to a drill rod for percussion drilling machines comprising a rod or a sleeve-shaped element that is provided with a threaded portion for engagement with another correspondingly threaded drill rod element. In order to reduce the risk for pitting damage, the threaded portion is provided with a wear lining that is metallurgically bonded to the rod. The lining is made of a metallic material that is softer than the material of the element, the latter usually being steel.

5 Claims, 2 Drawing Sheets

DRILL ROD FOR PERCUSSION DRILLING

BACKGROUND OF THE INVENTION

The present invention relates to an extension drill rod for percussion drilling machines, more specifically a drill rod consisting of a rod or a sleeve that is provided with a threaded portion for engagement with another correspondingly threaded drill rod.

Various types of threaded connections for percussion drilling machines are previously known in which flank angles and pitch angles have been varied in order to optimize the threaded coupling with regard to those percussive forces subjected to the threaded connections. It is still a problem, however, that excessive rapid wear occurs because of those increased percussive forces that are used with modern drilling machines. The main reasons for rapid wear of such threaded connections are pitting damages due to local heating and formation of friction martensite.

In accordance with the present invention a new solution to this problem is proposed according to which the threaded portion of the drill rod is provided with a wear lining consisting of a layer of a material softer than that of the drill rod, usually of steel, whereby the layer is metallurgically bonded to the threaded portion of the drill rod. One suitable wear lining material is a commercially available bronze material such as copper bronze or aluminum bronze.

The invention will now be described more in detail in connection with the appending drawings in which

THE DRAWINGS

Figure 3:
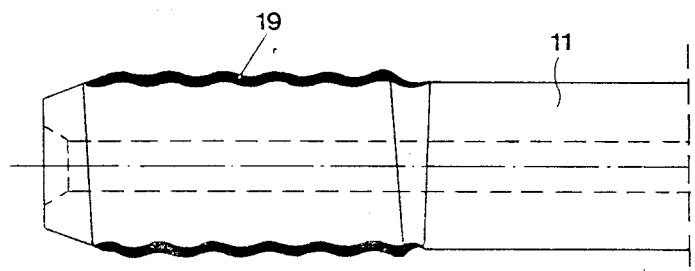
Figure 4:
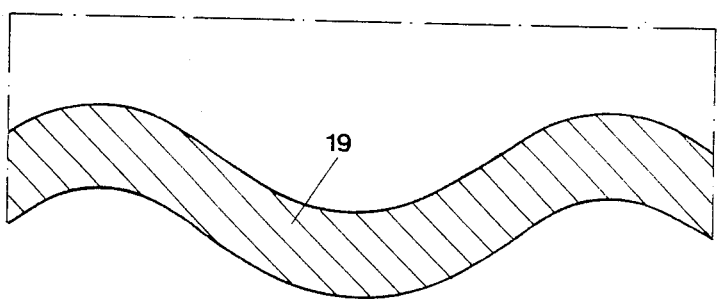
Figure 5:
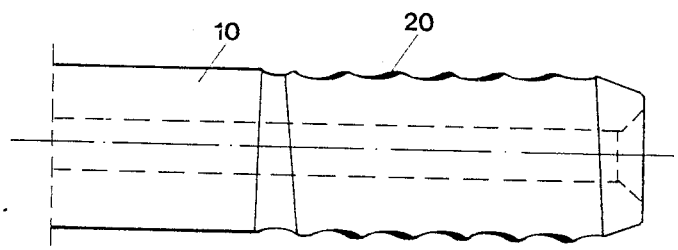
Figure 6:
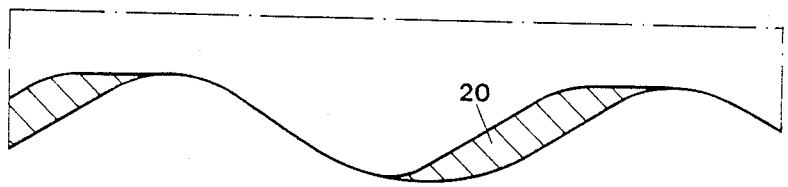
Figure 7:
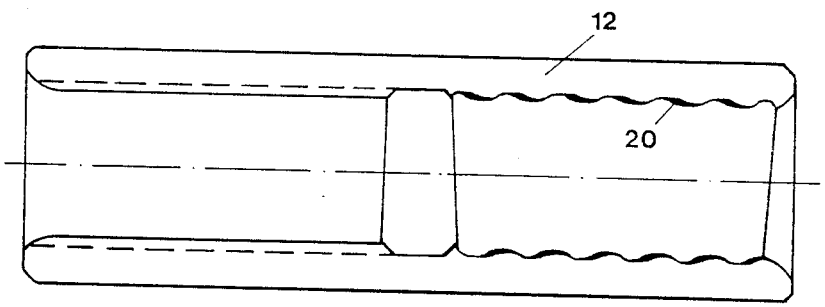
Figure 8:
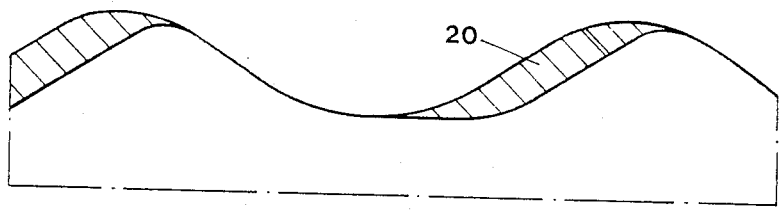

FIG. 3 is a partially enlarged axial section of the wear lining applied on to a drill rod in accordance with the present invention, FIG. 4 is an enlarged section of a wear lining of FIG. 3, FIG. 5 is an axial section of a drill rod according to an alternative embodiment of the invention, FIG. 6 is an enlarged axial section of the wear lining applied to the drill rod in FIG. 5, FIG. 7 is a coupling sleeve provided with a wear lining according to the invention, FIG. 8 is an enlarged section of the wear lining in FIG. 7.

DETAILED DESCRIPTION OF PREFERRED EMBODIMENTS OF THE INVENTION

Figure 1:
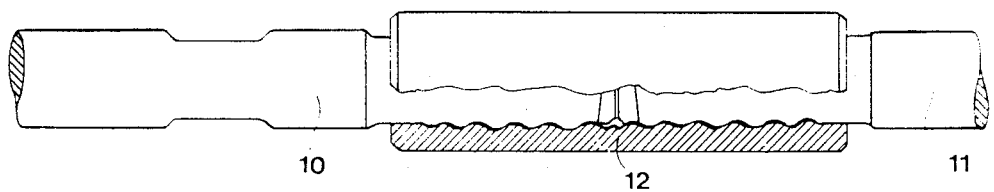
FIG. 1 is a sectional longitudinal view of a conventional threaded coupling.

The threaded coupling that is shown in FIG. 1 incorporates two externally threaded end portions of two drill rods 10 and 11 which are held together by an internally threaded coupling sleeve 12. Both the drill rods 10, 11 and the sleeve 12 are made of hardened steel.

Figure 2:
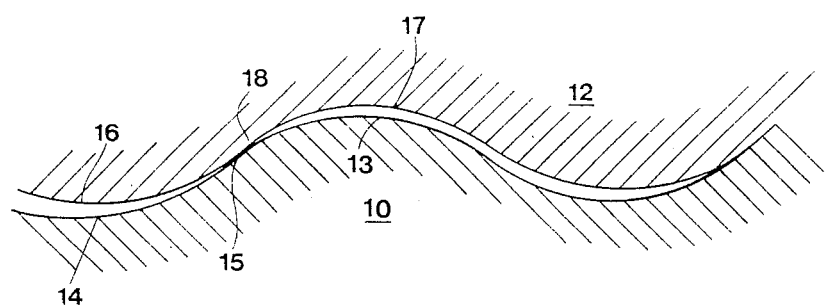
FIG. 2 is an enlarged longitudinal section of the threaded coupling of FIG. 1.

With the embodiment shown in FIGS. 1-2 the top portions 13 and the bottom portions 14 are smoothly rounded whereas the pressure flanks located therebetween are partially straight. The sleeve 12 is similarly provided with smoothly rounded top portions 16 and bottom portions 17, and partially straight flanks 18 therebetween. The threads are only abutting each other along the flank portions 15 and 18, respectively. The transition areas between the flanks and the tops and bottoms of the rod 10 and the sleeve 12 are smoothly rounded in order to eliminate exposure regions for fatigue cracks. The flank angle of the flanks 15, 18 measured in relation to the drill axis is normally in the area 25°–40° at the same time as the thread pitch amounts to 6.5°–9°.

In accordance with the invention the threaded portion of the rods 10, 11 is provided with a wear lining in the form of a layer 19 that is metallurgically bonded to the rod 10, 11. This wear lining 19 shall be made of a metallic material that is softer than the material from which the drill rod has been manufactured. It is the intention that such layer would give a certain lubricating effect to the steel. As suitable material for such wear lining can be mentioned copper bronze or aluminum bronze but also other materials softer than steel could be used.

In accordance with one preferred embodiment of the invention the wear lining 19 is provided as a layer continuously applied along the entire threaded portion with substantially constant layer thickness. Having regard to the fact that in such threaded couplings it is only one of the thread flanks that comes into abutment with the other tghread as shown in FIG. 2, it is also possible to apply the layer 20 to the threaded portion in a spiral pattern as shown in FIG. 4-5. In this instance layer 20 should be applied so that it covers the whole abutting flank and also an essential portion of the thread's bottom portion as shown in FIG. 6, whereas the non-abutting flanks could be entirely free from such layer.

In accordance with another possible embodiment of the invention, the wear lining could be provided as a coherent layer along the entire threaded portion. The thickness of which, however, could vary such that a thicker layer is provided along the abutting flank portions, whereas a thinner layer is provided along the remainder portion of the thread.

According to yet another embodiment of the invention, a first layer could be provided along the threaded portion on top of which a second layer 19, 20 is applied. As suitable material for said first layer could be used a nickel-based material or a cobalt-based material. The purpose of such embodiment would be to prevent copper penetration into the steel in connection with hardening. An intermediate layer of a nickel material could also be used in order to achieve an improved bonding between the outer wear lining and the drill rod.

The wear lining 19, 20 is preferably applied to the drill rod by thermal spraying of powder. In such case the rod must first be heated to a certain temperature which for hot spraying is about 300°–400° C. In connection with this spraying the temperature of the rod will increase. The rod is then allowed to cool off after which it is subjected to a turning operation aimed to give the desired final thread contour. When applying the lining in a spiral pattern the layer is first applied by thermal spraying after which the layer is taken away from the non-abutting flank portions of the thread. The wear lining 19 can also be applied by other methods such as hard brazing or by MIG—, TIG — or electrode arc welding methods.

In addition to drill rods threaded externally or internally at both ends, a wear lining according to this invention can also be applied to a drill rod having a male thread at one of its ends and a female thread at is other end. Such wear lining can also be applied to an adapter having a splinesprovided portion at one end and a threaded portion at its other end.

In accordance with a further embodiment of the invention the wear lining is applied to a drill rod, the threaded portion of which includes straight tops, straight bottoms and straight flanks portions therebetween where smoothly curved portions are provided as transitions between said tops, flanks and bottoms.

The layer thickness of said wear lining 19, 20 should normally be less than 4 mm. This recommended value should be selected for rods having a thread diameter in the range 32-45 mm. For coarser dimensions of such drill rods the thickness of said wear lining could be somewhat larger.

I claim:

1. A force-transmitting element in percussion drill rod assemblies, comprising a cylindrical metal body including an integral thread, and a lining disposed on said thread, said lining comprising a metallic material softer than said thread, said lining being metallurgically bonded to said thread, said lining extending substantially the entirety of said thread and being of greater thickness along one of the thread flanks than along a remaining thread flank.

2. A force-transmitting element in percussion drill rod assemblies, comprising a cylindrical metal body including an integral thread, and a lining disposed on said thread, said lining comprising a metallic material softer than said thread, said lining being metallurgically bonded to said thread, a nickel-based layer being interposed between said lining and said thread.

3. A force-transmitting element in percussion drill rod assemblies, comprising a cylindrical metal body including an integral thread, and a lining disposed on said thread, said lining comprising a metallic material softer than said thread, said lining being metallurgically bonded to said thread, a cobalt-based layer being interposed between said lining and said thread.

4. A percussion drill rod assembly comprising a metal rod having an external thread, and a hollow metal sleeve having an internal thread secured to said external thread, said threads being in contact along only one set of opposing thread flanks, and a lining disposed on the contacting flank of one of said threads, said lining comprising a metallic material softer than said one thread and being metallurgically bonded to said one thread, said lining extending along only the contacting flank of said one thread.

5. A percussion drill rod assembly comprising a metal rod having an external thread, and a hollow metal sleeve having an internal thread secured to said external thread, said threads being in contact along only one set of opposing thread flanks, and a lining disposed on the contacting flank of one of said threads, said lining comprising a metallic material softer than said one thread and being metallurgically bonded to said one thread, said lining extending along substantially the entirety of said one thread and being of greater thickness along the contacting flank of said one thread than along the other flank of said one thread.

* * * * *